May 15, 1962 A. D. CHIPMAN 3,034,944
WATER-ACTIVATED PREPASTED PLASTIC SHEETING
Filed June 20, 1957

INVENTOR
*Arthur Douglas Chipman*

BY
ATTORNEYS

3,034,944
WATER-ACTIVATED PREPASTED PLASTIC SHEETING
Arthur D. Chipman, Reading, Mass., assignor to The General Tire & Rubber Company, Akron, Ohio, a corporation of Ohio
Filed June 20, 1957, Ser. No. 666,919
3 Claims. (Cl. 154—53.5)

This invention relates to a method of adhering laminated plastic sheeting to a wall or other suitable surface.

Polyvinyl base composition sheet materials, such as polyvinyl chloride sheets, are desirable for wall and floor covering because of their excellent resistance to oxidation, oils, and soaps. Also, the vinyl compositions can be produced in a variety of colors and the vinyl sheet material can be printed or embossed on its surface to form an attractive article.

In the past lignin base adhesives have been used to adhere the polyvinyl chloride composition sheet materials to walls by application of the adhesive to the wall immediately before applying the sheet materials to the walls. The application of the correct amount of the lignin base adhesive generally cannot be controlled except by an experienced man so that its application with sheeting by unskilled persons usually produces unevenness and deposits of excess adhesive at the edges which lead to an unattractive wall covering. Attempts have been made to apply a paste adhesive at the factory and merely moisten it with water at the time of application. However, this method heretofore has been ineffective and has required considerable water brushing or dipping at the site of application in order to soften all of the lignin adhesive in order to make it stick. This method also has been unsatisfactory due to premature drying in localized areas apparently due to an uneven distribution of water throughout the paste.

It is an object of the present invention to provide a method of making a prepasted polyvinyl chloride composition sheet material which can be easily and quickly activated with water for adherence to a wall.

It is an object to provide a method of making polyvinyl chloride sheet material that can be prepasted with an adhesive layer which may be quickly activated with water and evenly distributed thereon so as not to cause premature drying in localized areas.

It is an object to provide an adhesive composition for polyvinyl chloride sheet material which can be applied in a substantially dry state and later made sticky with a small amount of water just prior to adhering the sheet material to a wall.

It is an object to provide a laminated wall covering that is dimensionally stable and which can be applied with ease by inexperienced personnel.

Other objects of the invention will be apparent from the following description and appended claims, and the drawings in which:

Figure 1:
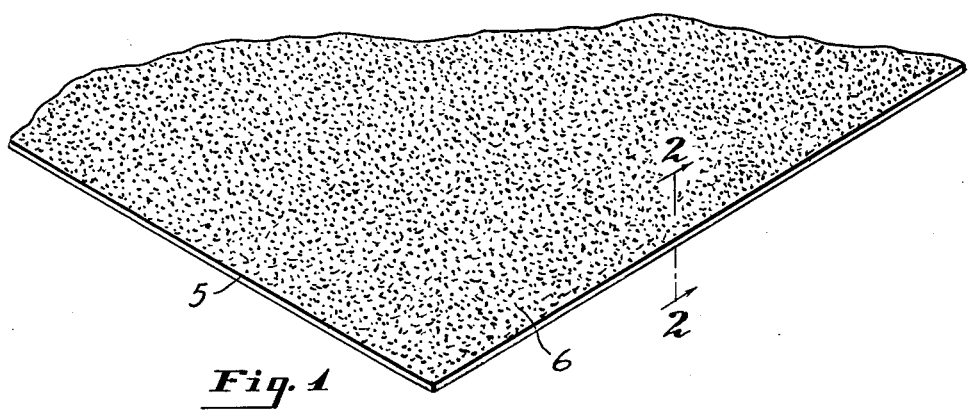
FIGURE 1 is a perspective view of the polyvinyl chloride laminated sheet material.
Figure 2:
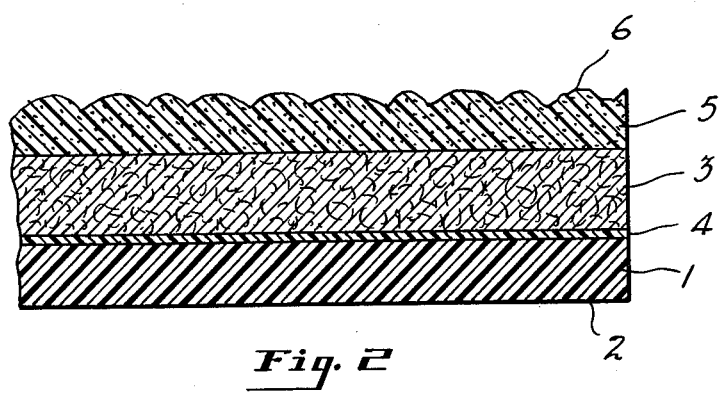
FIGURE 2 is a sectional elevational view of the laminated sheet taken along the lines 2—2 indicated in FIGURE 1 and on an enlarged scale.

In accordance with the present invention, a polyvinyl base wall covering comprising an upper layer 1 of a polyvinyl chloride composition preferably having a printed or embossed surface 2 is bonded to a suitable backing layer 3 by an adhesive layer 4. The backing layer comprises a suitable paper backing such as a rubber bonded paper, which is provided on the reverse side thereof with a dry water-activatable adhesive layer 5. The dry adhesive layer has a rough uneven outer surface 6 and the layer itself has porosity and capillary passages for quick absorption of water or other activating liquid for the adhesive.

The polyvinyl chloride layer 1 and the paper backing 3 are shown and described in United States Patent 2,759,866 to Malcolm Seymour. In the formation of the dry adhesive layer on the paper side of the plastic laminate, the paper layer is wet with water or a dilute solution of lignin paste. The dry adhesive paste comprising lignin, clay, and asbestos particles, is dusted or flocked on the moistened paper, followed by a spray of water or dilute adhesive to wet-out the binder. This sequence may be repeated in order to build up a desirable adhesive layer.

The polyvinyl plastic layer is preferably a composition having a major proportion of a polymer of the general formula:

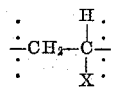

where X is hydrogen or chlorine. While the preferred polymers of the polyvinyl base composition are polyvinyl chloride and copolymers of vinyl chloride and vinyl acetate, other suitable polymers are polyvinylidene chloride or copolymers of vinyl chloride and vinylidene chloride. The polymers described above preferably are plasticized with polymeric type plasticizer when the plastic laminate is dimensionally stable as described in United States Patent No. 2,759,866. Examples of suitable polymeric plasticizers which are nonmigratory are polypropylene glycolsebacate, polyethylene and/or polypropylne-glycol adipates, and other viscous to rubbery condensation products of a polyol or mixed polyol with one or more polybasic acids, particularly condensation products of the lower molecular weight glycols such as ethylene, diethylene, propylene, dipropylene, butylene and mixed glycols with aliphatic dibasic acids, such as adipic, phthalic, isosebacic, sebacic acids, etc. A small amount of a migratory monomeric plasticizer, such, for example, as dioctyl terephthalate, dioctyl phthalate, dioctyl adipate, tricresyl phosphate, and dioctyl sebacate, etc., may also be used.

The plastic layer 1 may be printed or embossed with attractive designs and its thickness generally is about .005 to .025 inch.

The fibre backing layer preferably used as a base for the plastic layer is a felted cellulose, rubber impregnated paper or textile fabric, and wood fibers treated with rubber or resin latex, pressed together to form a chip board. The thickness of the fiber backing is generally about .01 to .02 inch but may be in the range of .005 to .03 inch.

As noted in United States Patent No. 2,759,866, the plastic layer may be bonded to the fiber backing layer by a thermoplastic adhesive such as a vinyl chloride-vinyl acetate copolymer which is applied at about 5 to 40 percent by weight of a solution in a suitable organic solvent such as a mixture of methyl ethyl ketone and toluol.

The strong dry adhesive layer 5 is formed by a composition which is made by mixing a water-activated adhesive, which is preferably a dry lignin powder, with particles of a fibrous material such as asbestos and a suitable filler such as clay to form a very economical adhesive. The fibrous material which is preferably present apparently readily absorbs water and provides a porous structure by means of a plurality of passageways so that the water can quickly and uniformly wet all of the adhesive particles. The fibrous material also serves as a reservoir for water and an efficient distributor of the water or other activating liquid so that there is a minimum of premature drying of the adhesive particles in localized areas. The usual range in parts by weight of the composition as well as the preferred range for the dry adhesive also are indicated as follows:

*Table I*

| Ingredients | Parts by Weight | |
| --- | --- | --- |
| | Preferred Range | Usual Range |
| Lignin particles | 80 | 50–110 |
| Clay | 40 | 20–60 |
| Asbestos fibers | 50 | 30–70 |

The preferred adhesive particles of the adhesive composition are lignin, which is an organic compound that cements together cellulose fibers in wood and other plants. As is well known the lignin particles have sticky thermoplastic characteristics in the presence of water and dry out to form strong bonds between laminated layers. The lignin is considerably superior to other adhesives in that it confers better adhesiveness and better dimensional stability but it can be substituted for by other water-activated adhesive particles such as dry casein and dry vegetable starches such as those derived from corn, wheat, potatoes, and rye which are water soluble and dry to a hard film to obtain some of the advantages had by the use of lignin.

The preferred inert fibrous materials are fibers of asbestos which are generally short and chopped. The asbestos fibers may be replaced by other porous fibrous materials which readily absorb water, such as ramie, cotton and wool fibers.

While clay has been used as a filler in the examples of dry adhesives, other fillers such as zinc oxide, powdered quartz, calcium carbonate, and other inert fillers may be used in place of part or all of the clay.

When the dry adhesive is first flocked or dusted on the fibrous backing layer, it is preferred that just enough water or dilute lignin solution be applied to the backing layer so that the dry adhesive particles will stick to the backing layer. As soon as the lignin, clay and asbestos particles are dried to the backing layer, the polyvinyl base composition sheet material is then ready for use.

It has been found that the application of a dry, tough, adherent adhesive coating on the plastic laminated sheeting reinforces the sheeting and makes it more dimensionally stable. The tough, hard coating of lignin, etc. prevents shrinking and curling of the vinyl sheeting during storage and in transit before application to a wall or other surface. When square pieces are prepared for wall tile and the like, the strong hard dry adhesive coating, with or without the fibrous material, keeps the pieces square and tends to eliminate shrinking. While the dry adhesive may be used without the fibrous material, a much longer time is then required to wet the adhesive and there may be some tendency for premature drying in localized areas, as previously explained.

When the dimensionally stable wall covering is to be applied to a wall or suitable base, water or dilute lignin solution is lightly sprayed or brushed on to activate or soften the adhesive. It is then applied to the wall or suitable base which may, for example, be plasterboard, masonite, unfinished or painted wood, well-bonded wallpaper, plastered surface, etc.

Generally less than one minute is required for the water or other activating liquid to penetrate and soften the adhesive particles, even using a light spraying treatment. After application of the wall covering to the tile, for best results the wall covering is subjected to rolling to remove any entrapped air.

It is also to be understood that in accordance with the provisions of the patent statutes, the particular form of product shown and described and the particular procedure set forth are presented for purposes of explanation and illustration and that various modifications of said product and procedure can be made without departing from my invention.

What I claim is:

1. A laminated plastic sheet material which can be readily adhered to a wall by water activation of an adhesive layer comprising an upper layer of a polyvinyl base composition, an intermediate layer of a fibrous backing material and lower layer of a dry adhesive composition comprising water activatable adhesive particles and a fibrous filler that readily absorbs water and is chemically inert to water and the adhesive, said adhesive particles being used in an amount of from 50 to 110 parts by weight and said fibrous filler being used in an amount of from 30 to 70 parts by weight in said adhesive composition.

2. A laminated sheet material as defined in claim 1 wherein said upper layer is formed of polyvinyl chloride and has a printed design thereon.

3. A laminated sheet material as defined in claim 1 wherein said fibrous filler comprises asbestos fiber particles and said adhesive composition contains clay particles.

References Cited in the file of this patent

UNITED STATES PATENTS

| | | |
| --- | --- | --- |
| 2,077,884 | Howard et al. | Apr. 20, 1937 |
| 2,148,137 | Spitzli | Feb. 21, 1939 |
| 2,201,877 | Anderson | May 21, 1940 |
| 2,261,782 | Staude | Nov. 4, 1941 |
| 2,322,930 | Gardner | June 29, 1943 |
| 2,443,889 | Bruce et al. | June 22, 1948 |
| 2,444,830 | Kellgren et al. | July 6, 1948 |
| 2,478,939 | Pape | Aug. 16, 1949 |
| 2,542,344 | Mersereau | Feb. 20, 1951 |
| 2,579,482 | Fenn | Dec. 25, 1951 |
| 2,683,706 | Muller | July 13, 1954 |
| 2,759,866 | Seymour | Aug. 21, 1956 |